United States Patent [19]

Shih et al.

[11] Patent Number: 4,965,816
[45] Date of Patent: Oct. 23, 1990

[54] DIGITAL LOGIC CIRCUIT FOR INCREMENTAL ENCODERS

[75] Inventors: Liang Shih, Rochester; Clifford L. Skillings, Brockport, both of N.Y.

[73] Assignee: Eastman Kodak Company, Rochester, N.Y.

[21] Appl. No.: 361,065

[22] Filed: Jun. 5, 1989

[51] Int. Cl.⁵ .................... H03D 13/00; H03K 21/02; G06M 3/02
[52] U.S. Cl. ........................................ 377/17; 377/45; 377/55; 377/111; 307/512; 307/515; 328/166
[58] Field of Search ...................... 377/17, 45, 55, 111, 377/117, 112; 328/166; 307/511, 575

[56] References Cited

U.S. PATENT DOCUMENTS

| | | | |
|---|---|---|---|
| 3,665,323 | 5/1972 | Peterson | 377/45 |
| 3,917,926 | 11/1975 | Gerard et al. | 377/55 |
| 3,982,107 | 9/1976 | Butler | 377/55 |
| 4,016,432 | 4/1977 | Marzalek | 377/126 |
| 4,060,242 | 11/1977 | Huang | 377/55 |
| 4,446,389 | 5/1984 | Williams et al. | 328/166 |
| 4,634,860 | 1/1987 | Aiello et al. | 307/515 |
| 4,664,523 | 5/1987 | Dorsman | 307/515 |

Primary Examiner—John S. Heyman
Attorney, Agent, or Firm—Edward Dugas

[57] ABSTRACT

A digital logic circuit for use with an incremental positioning encoder is presented. The circuit converts two quadrature pulse train signals, generated by an incremental position type encoder, to a counting CLOCK signal and an UP/DOWN count signal. The signals are transmitted on counters to generate counting clock signal and the UP/DOWN count position information. The circuit utilizes gate delays to detect the edge of a pulse train signal. No external clocks or comparators are nested. The design, by relying on the propagation delay of gates, keeps the circuit simple and more reliable.

6 Claims, 4 Drawing Sheets

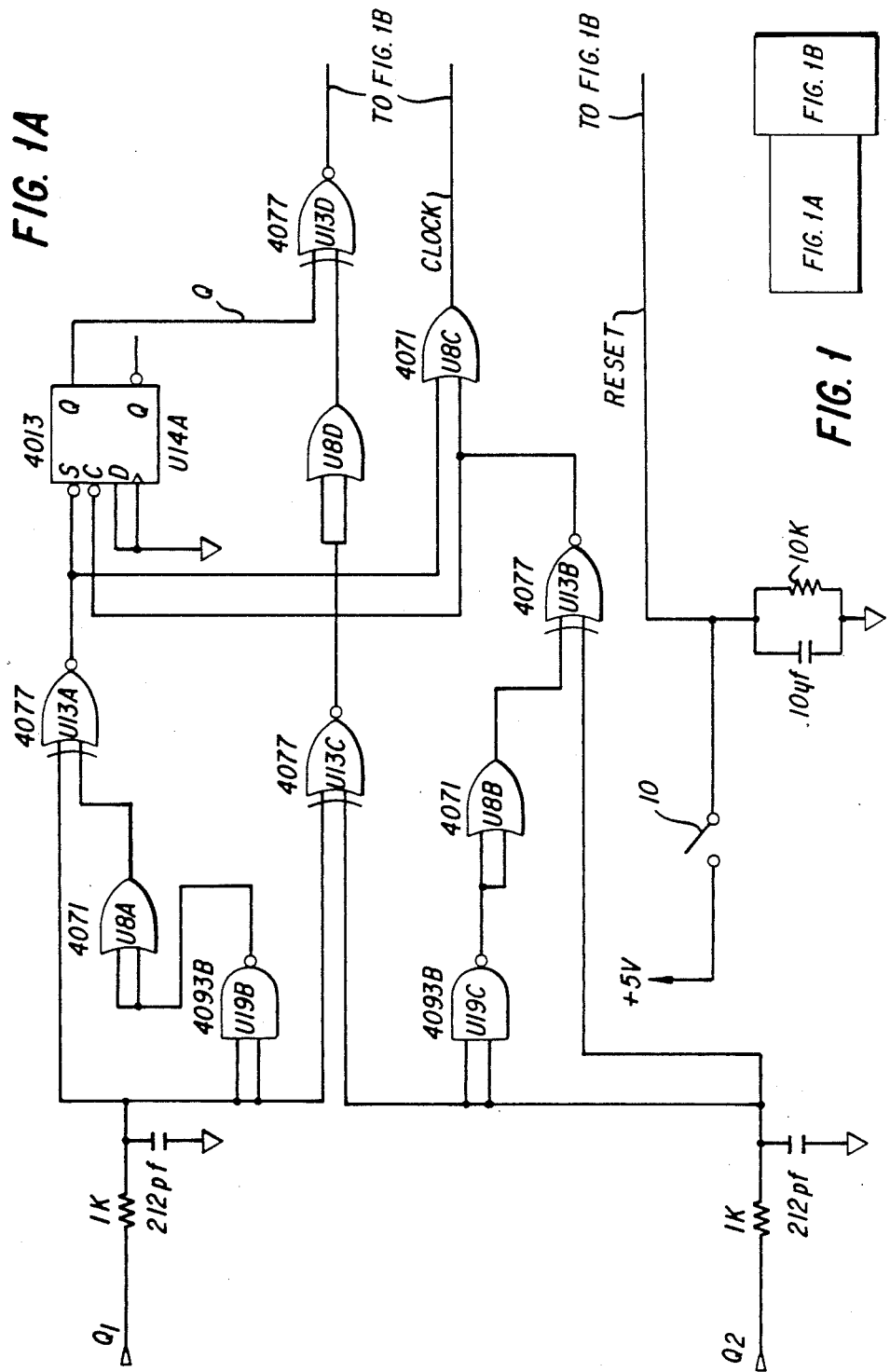

DIGITAL LOGIC CIRCUIT FOR INCREMENTAL ENCODERS

BACKGROUND OF THE INVENTION

1. Field of the Invention

The present invention relates generally to control circuits for incremental positioning encoders and more particularly to a digital logic circuit particularly adapted for use with an incremental position type encoder.

2. Description of the Prior Art

Encoders are important components of motion control systems. For closed-loop control, encoders are used to feedback the actual position and/or speed of a device for comparison with a reference corresponding to a desired position and/or speed. Open-loop systems often have encoders coupled to their movable members, such a motor output shafts, for providing signals indicating direction of motion and the distance to the final desired position. Typically, encoders generate two quadrature pulse train signals to increase resolution and to decide the moving direction of, for example, an associated output shaft. More specifically, this happens in disk drives which utilize tracking error signals to generate quadrature signals to indicate the position of a read/write head with respect to a disk track. To convert the quadrature signals, generally two pulse trains, to position information, an electronic circuit incorporating digital logic components is used. The circuit accepts the two quadrature pulse trains and converts them to a counting CLOCK signal and an UP/DOWN count signal. By passing the signals through a counter circuit, which counts a net number of the count pulses, a position information signal can be obtained.

A patent of interest for its teaching in this art is U.S. Pat. No. 3,843,915 entitled "Servo-Motor Control System Including A Two Phase Digital Shaft Position Detector" by J. E. Helmbold.

Another patent of interest for its teachings in U.S. Pat. No. 4,481,569 entitled "Feedback System For Robot Controller" by S. A. Hoodbhoy.

The digital logic circuits used in the above referenced patents use an external clock and a flip/flop circuit to detect the edge of each pulse in a pair of pulse trains. After obtaining the edge signals for each of the two pulse trains, an UP/DOWN count signal and count pulse signals are generated. The UP/DOWN count signal and the counting pulse signals are then used as the input signals to a counter. The output signal from the counter is the position information signal which then can be used to activate, for example, a closed-loop servo controller.

SUMMARY OF THE INVENTION

In the present invention, a digital logic circuit functions to convert two input quadrature phase pulse train signals to a count CLOCK signal and an UP/DOWN count signal without the use of an external CLOCK signal. The two quadrature phase pulse train signal are each delayed by an associated NAND and OR gate. When the two input signals are each exclusively NOR'd with their delayed self the result is a pair of signals having edges corresponding to each of the pulses in their respective pulse trains. The two edge signals are then logically OR'd together to generate a counting CLOCK signal. The two input signals are also exclusively NOR'd to produce another pulse train signal which is exclusively NOR'd with the output of a flip/flop to create and UP/DOWN count signal. The input signals to the flip/flop are the pair of edge signals derived from the two input quadrature phase signals. The count CLOCK signal is directed to a counter along with the UP/DOWN count signal such that the counter's output signals indicate the magnitude of the counted pulses.

From the foregoing it can be seen that it is a primary object of the present invention to provide an improved digital logic circuit for use with an incremental position type encoder.

It is another object of the present invention to provide a digital logic circuit which uses a small number of components to achieve a reduced response time.

It is a further object of the present invention to provide a simpler and more reliable digital logic circuit for use with an incremental encoder.

These and other objects of the present invention will become more apparent when taken in conjunction with the following description and drawings wherein like characters indicate like parts and which drawings form a part of the present disclosure.

DESCRIPTION OF THE PREFERRED EMBODIMENT OF THE INVENTION

Figure 1B:
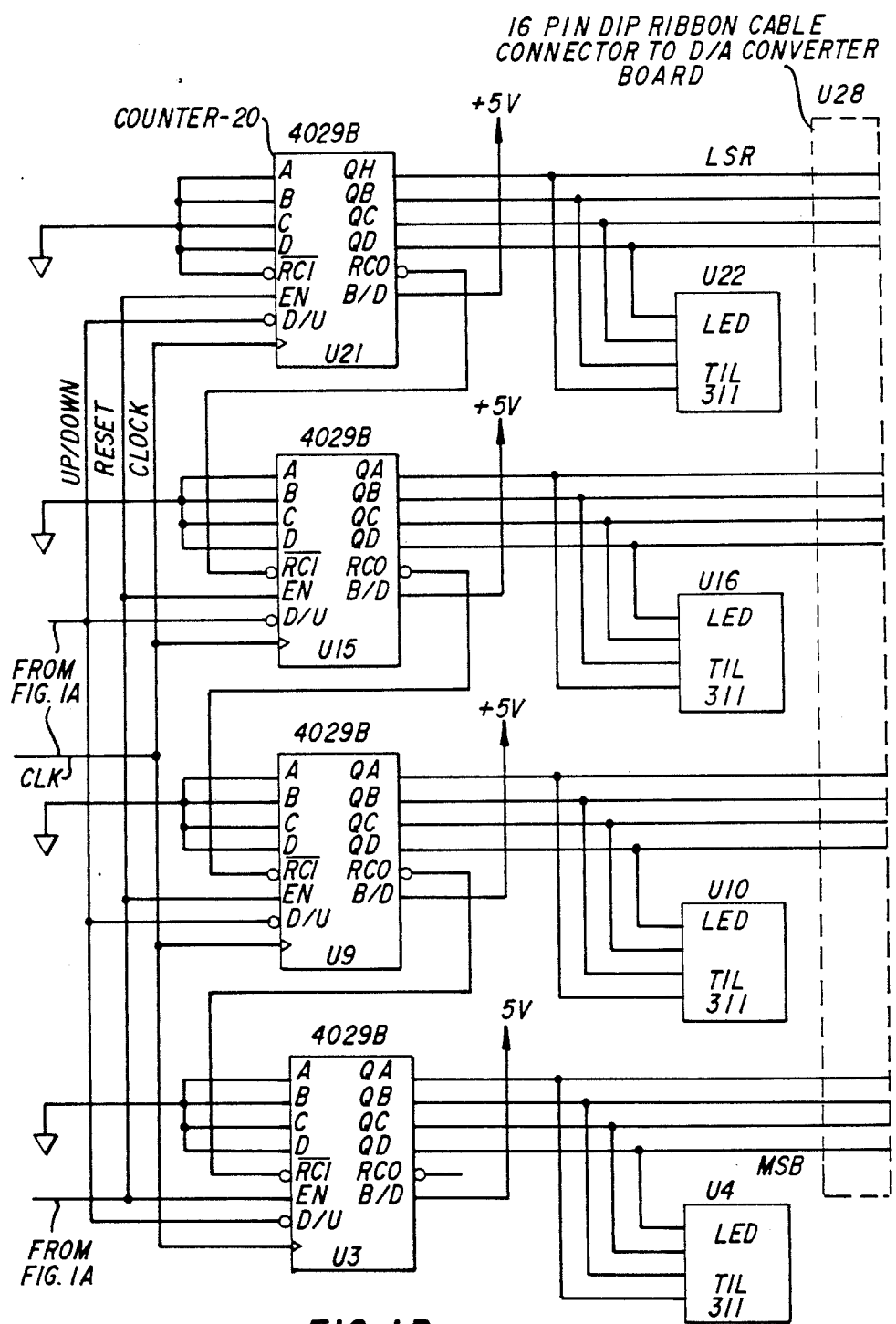
FIGS. 1 (A–B) are a schematic diagram which illustrates the preferred circuit embodiment of the invention at a logic chip level.
Figure 2A:
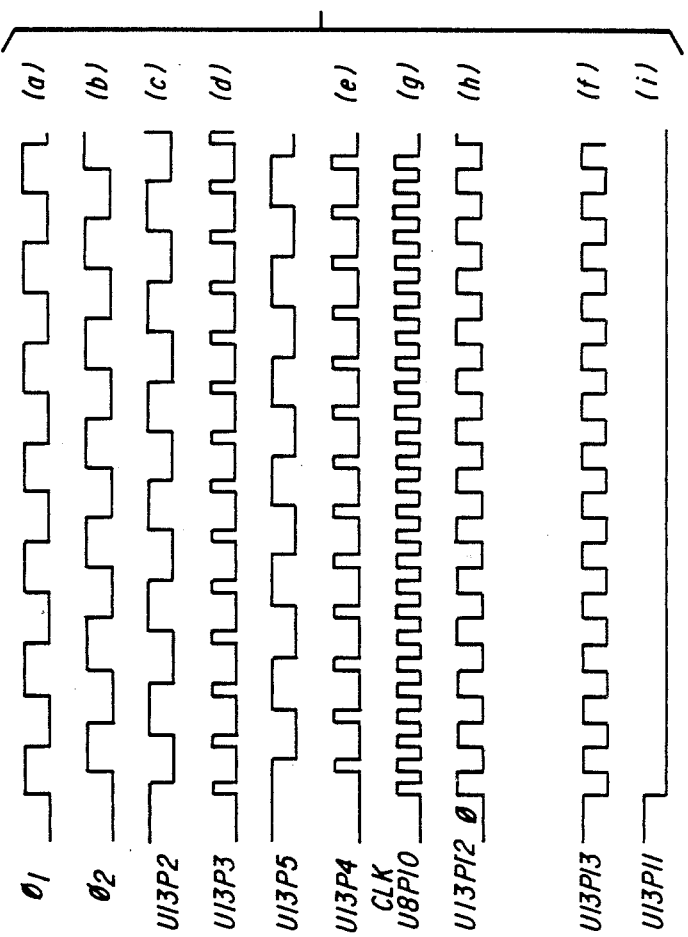
FIGS. 2A and 2B are timing diagrams illustrating the timing relationship of signals taken from strategic locations of the preferred circuit embodiment shown in FIG. 1.
Figure 2B:
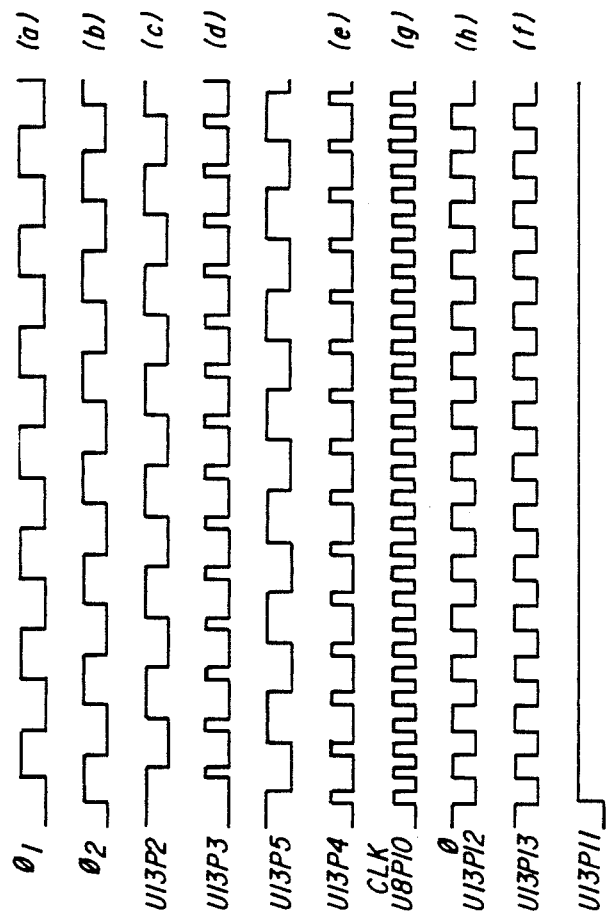

Referring to FIG. 1, the $\phi_1$ signal (shown in FIGS. 2A and 2B) is applied to the inputs to a NAND gate U19B, an input to an Exclusive-NOR gate U13C, and an input to an Exclusive-NOR gate U13A. In a like manner, the quadrature phased signal $\phi_2$ (shown in FIGS. 2A and 2B)) is applied to the inputs of a NAND gate U19C, and an Exclusive-NOR gate U13B, and to an input to the Exclusive-NOR gate U13C. In FIG. 2A the signal $\phi_1$ is shown leading the signal $\phi_2$. In FIG. 2B the signal $\phi_2$ is shown leading the signal $\phi_1$. Which signal leads is determined by the direction of rotation of linear motion from a reference position of the encoder producing the signals. The output signal from NAND gate U19B is directed through an OR gate U8A to an input of the Exclusive-NOR gate U13A. In a like manner, the output signal from NAND gate U19C is directed through an OR gate U8B to an input of the Exclusive-NOR gate U13B. Each of the quadrature phased pulse train signals $\phi_1$ and $\phi_2$ are delayed by the effects of their respective NAND and OR gates (which delay is well known in the digital logic circuit art). The output signals from the Exclusive-NOR gates, U13A and U13B, produce edge signals from the pulses making up the input pulse trains.

The output signal from the OR gate U8A, is the gate delayed signal $\phi_1$, shown in FIGS. 2A and 2B as U13P2. The edge signal from the Exclusive-NOR gate U13A is shown in FIGS. 2A and 2B as U13P3. In a like manner the gate delayed signal $\phi_2$ from the output of OR gate U8B is shown in FIGS. 2A and 2B as U13P5 and the exclusively-NOR'd signal for the quadrature signal $\phi_2$ is shown in FIGS. 2A and 2B as U13P4.

The Exclusive-NOR gate U13C, upon receiving the quadrature phase signals $\phi_1$ and $\phi_2$, logically NORs them together to provide a signal to the inputs of a NOR gate U8D. From there the signal is passed to an input to an Exclusive-NOR gate U13D and is shown in FIGS. 2A and 2B as U13P11. The OR gate delay, provided by U8D produces a delay which corresponds to the delay caused by a D-type flip/flop U14A. An OR gate U8C, logically combines the signals from the Exclusive-NOR gates U13A and U13B to provide the CLOCK signal U8P10. The D-type flip/flop U14A receives the edge signals from the Exclusive-NOR gates U13A and U13B on its S/ and C/ inputs, respectively, to provide at its output the Q signal U14P12. The signal U13P12 and U13P13 are exclusively NOR'd by Exclusive-NOR gated U13D to provide the UP/DOWN signal U13P11.

A reset/clear switch 10 is connected to a +5 volt source to provide a RESET signal. A counter 20, comprised of four bit counter sections U3, U9, U15 and U21, forms a cascaded counter which receives the three signals, UP/DOWN, RESET and CLOCK, resulting from the previously described circuit. The counter 20 counts CLOCK pulses, either up or down, as a function of the logic level of the UP/DOWN signal. The output count from the bit counter section is directed to LED units U4, U10, U16 and U22 to give a visual indication of the count within their respective counter sections. The output count may be converted to an analog format by a D to A converter (not shown) for purposes of driving some desired apparatus or for providing a position signal indicative of the positioning of the device from which the quadrature phased encoding signals were generated.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

We claim:

1. A digital logic circuit for receiving a pair of quadrature phased pulse train signals indicative of position and direction of an associated member comprising:
   a pair of serially connected NAND and OR gates each receiving one of said quadrature phased pulse train signals for providing a two gate delay signal;
   a pair of exclusive-NOR gates each receiving one of said two gate delay signals with one of said quadrature phased pulse train signals to provide said pair of edge signals;
   an OR gate for combining said provided pair of edge signals from said pair of logic means to provide a CLOCK signal;
   means for receiving said pair of quadrature phase pulse train signals and said pair of edge signals from said pair of exclusive-NOR gates for converting said signals to an UP/DOWN count signal;
   means for providing a RESET signal; and
   counter means for receiving said CLOCK signal, said UP/DOWN count signal, and said RESET signal, for providing output count signals in accordance with the CLOCK signal, in a direction determined by said UP/DOWN count signal, for a duration determined by said RESET signal, indicative of the direction and position of the associated member.

2. A digital logic circuit for receiving a pair of quadrature phased pulse train signals indicative of position and direction of an associated member comprising:
   first means for receiving said pair of quadrature phased pulse train signals for converting said quadrature pulse train signals to a pair of edge signals which are combined to provide a CLOCK signal;
   a first gate for receiving as inputs said pair of quadrature phased pulse signals and for providing as an output a logically combined signal;
   a flip/flop circuit for receiving said pair of edge signals from said first means and for providing an output signal;
   a second logic gate for combining said logically combined signal from said first logic gate with said output signal from said flip/flop circuit to provide an UP/DOWN count signal;
   means for providing a RESET signal; and
   counter means for receiving said CLOCK signal, said UP/DOWN signal, and said RESET signal, for providing output count signals, in accordance with the CLOCK signal, in a direction determined by said UP/DOWN count signal, for a duration determined by said RESET signal, indicative of the direction and position of the associated member.

3. The digital logic circuit according to claim 2 wherein said first and said second logic gates are Exclusive-NOR gates and said flip/flop circuit is a D-type flop flop having an S/ and a C/ input with one of said edge signals applied to said S/ input and other other applied to said C/ input.

4. The digital logic circuit according to claim 2 and further comprising:
   a third logic gate having a delay corresponding to the delay of said flip/flop circuit said third logic gate interposed between the output of said first logic gate and an input to said second logic gate.

5. The digital logic circuit according to claim 2 wherein said counter means is comprised of:
   four cascaded four-bit counters, each having at least an enable input for receiving said RESET signal, and UP/DOWN input for receiving said UP/-DOWN signal and a CLOCK input for receiving said CLOCK signal, for providing a four-bit output indicative of the count therein.

6. The digital logic circuit according to claim 5 and further comprising:
   four indicating means, one each, connected to receive the four-bit output of each of said cascaded four-bit counters to provide a visual indication of the count in each of said four-bit counters.

* * * * *

UNITED STATES PATENT AND TRADEMARK OFFICE
CERTIFICATE OF CORRECTION

PATENT NO. : 4,965,816

DATED : October 23, 1990

INVENTOR(S) : Ling Shih, et. al.

It is certified that error appears in the above-identified patent and that said Letters Patent is hereby corrected as shown below:

```
Abstract, line 10, delete "nested" and insert "needed"
Abstract, line 7, delete"on" and insert "to"
Column 2, line 4, delete "dervied" and insert "derived"
Column 4, line 16, insert "logic" between "first" and "gate"
Column 4, line 29, delete ","
Column 4, line 31, delete ","
Column 4, line 38, delete one of the "other"
```

Signed and Sealed this

Eighteenth Day of May, 1993

*Attest:*

MICHAEL K. KIRK

*Attesting Officer*   *Acting Commissioner of Patents and Trademarks*